Aug. 4, 1931.  W. PURCELL  1,817,844
BRAKE OPERATING MECHANISM
Filed Aug. 26, 1930
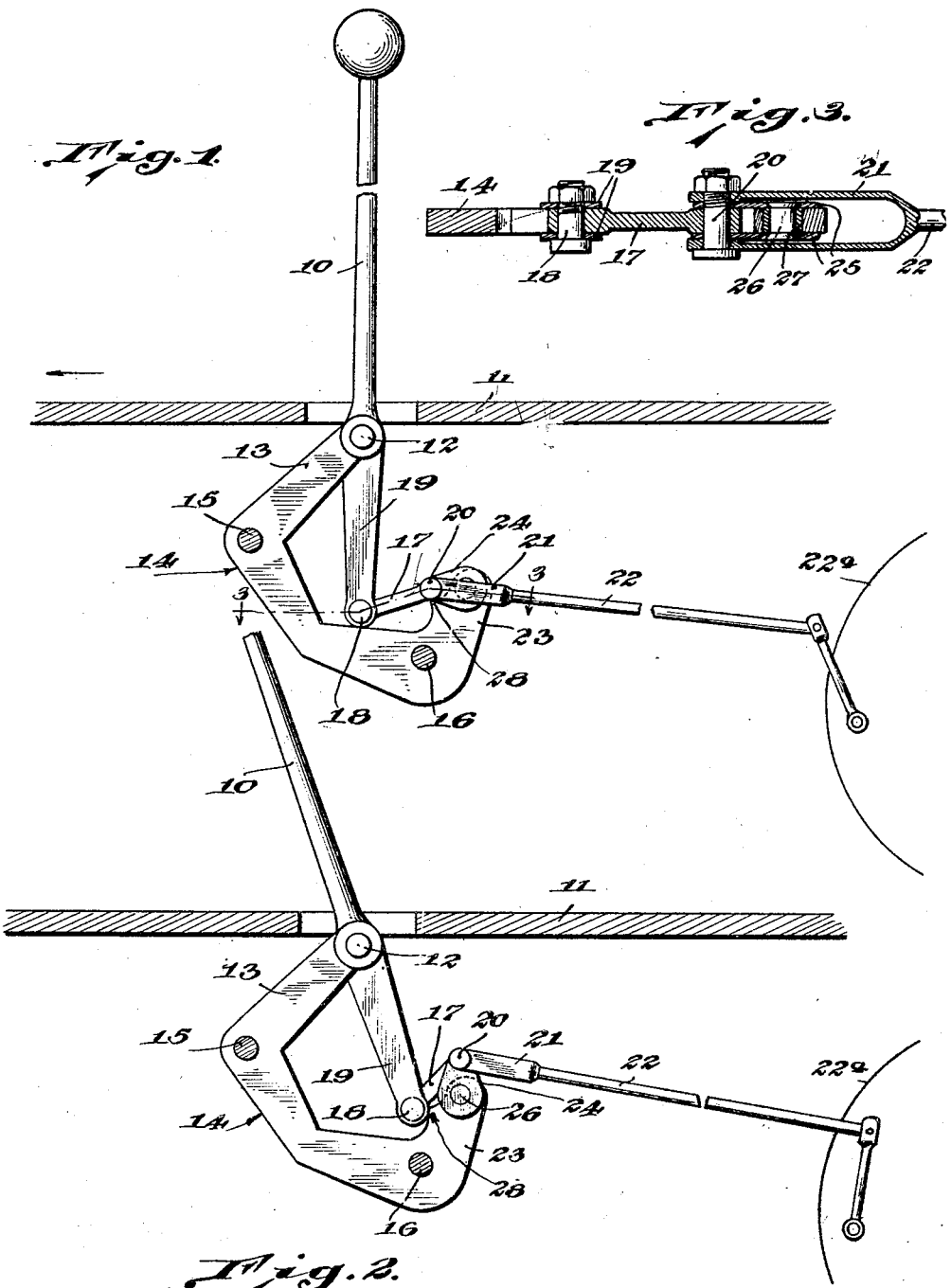
WITNESS
INVENTOR
Watson Purcell
BY
ATTORNEY Patented Aug. 4, 1931

1,817,844

UNITED STATES PATENT OFFICE

WATSON PURCELL, OF COLEMAN, TEXAS

BRAKE OPERATING MECHANISM

Application filed August 26, 1930. Serial No. 477,886.

My invention relates to brake operating mechanisms and partially to a device of this character adapted for use in connection with the emergency brake of automobiles.

It is an object of the present invention to provide a brake operating mechanism which will positively hold the brake rod in set position without the use of the usual pawl and ratchet commonly used on existing brakes.

A further object of the invention is to provide a device of this character which may be readily applied to existing automobiles in place of the usual type of brake operating lever.

A further object of the invention is to provide a device which will positively release the brake when moved to inoperative position.

A further object is to provide a brake operating mechanism of strong and simple construction and one which may be cheaply and easily manufactured.

Further objects of the invention will become apparent during the course of the following description, taken in conjunction with the accompanying drawings, in which like numerals refer to like parts throughout the same, and in which:

Figure 1 is a side elevation of the device showing the parts in set position;

Figure 2 is a view similar to Figure 1, showing the parts in released position; and Figure 3 is a section, taken on line 3—3 of Figure 1 and looking in the direction of the arrows.

Referring now to the drawings, it will be seen that a brake lever 10 is provided which projects through the floor-board 11 of an automobile in the usual manner. The lever 10 is fulcrumed at 12 to the upper end of one leg 13 of a substantially U-shaped plate 14. The plate 14 is attached to the side of the transmission housing (not shown) by means of stud bolts 15 and 16.

A link 17 is pivotally connected by means of a pivot bolt 18 to the lower forked extremity 19 of the brake lever 10, as is more clearly shown in Figure 3. The link 17 extends rearwardly from the pin 18 and is pivotally connected by pivot bolt 20 to the forwardly terminating forked end 21 of the brake rod 22 used to operate a conventional emergency brake 22ª, the end of the link being received between the forks of the rod 22.

The rearward leg 23 of the U-shaped plate 15 terminates upwardly and is provided at such upper end with a short knuckle lever 24 which is fulcrumed thereon. This knuckle lever is composed of side plates 25 received on either side of the leg 23 and pivoted thereto by a rivet pin 26. A bushing 27 may be provided to surround the rivet 26. The free end of the spaced plates 25 of the knuckle lever 24 are pivotally connected to the rearward terminus of the link 17 and the forward terminus of the fork 21 by means of the same pivot bolt 20 above referred to, the ends of the link 17 being received between the plates 25 and these in turn being received within the fork 21.

The forked end 21 of the brake rod 22 should be long enough so as to straddle the end 23 when the brake is in set position as shown in Figures 1 and 3.

On the inner edge of the leg 23 is formed a detent 28. This detent is substantially midway of the leg 23 and is so placed as to form a stop for the end of the knuckle lever when the pivot bolt 20 is drawn forwardly by the brake lever and swings past its dead center position. The detent 28 also serves as a stop for the lower extremity of the brake lever when the brake is released.

In the operation of the device, when the free end of the brake lever is drawn rearwardly the lower extremity travels forwardly as will be readily understood, whereupon the link 17 draws the pivot bolt 20, together with the brake rod and the free end of the knuckle lever 24, to the position shown in Figure 1, thereby tightening the brake. When the pivot bolt 20 travels past the dead center of the knuckle lever 24 the pull of the brake rod will have a tendency to draw the pivot downwardly. By providing the detent 28 this downward travel is stopped just past dead center thereby leaving the parts locked in brake setting position, the pull of the brake rod serving to hold the parts in this position.

The lower extremity of the brake lever being long enough to dispose the pivot 18 below the pivot 20 when the parts are in set position, the brake may be readily released by merely pushing forwardly on the free end of the brake lever. This action moves the lower end rearwardly and the link 17 will then serve to urge the pivot 20 upwardly past dead center and when this is done the pull of brake rod 22 will automatically draw the parts to released position. In case the brakes are not automatically fully released, further movement forwardly of the lever 10 will positively urge the parts to fully released position, which position would be reached when the lower end 19 of the lever 10 contacts with the detent 28.

Although a preferred embodiment of the invention has been shown and described, it is to be understood that various changes in the detailed construction, as may seem desirable, may be made without departing from the spirit of the invention within the scope of the appended claims.

I claim:

1. In a brake operating mechanism, a hand lever, a knuckle lever, a link connecting one end of said hand lever and said knuckle lever, a brake, and an actuating rod for said brake being pivotally connected to said knuckle lever, the pivotal point of the brake actuating rod and knuckle lever being moved to a position past the dead center of the fulcrum point of said knuckle lever when the brakes are in set position.

2. In a brake operating mechanism, a hand lever, a knuckle lever, a link connecting one end of said hand lever and said knuckle lever, a brake, an actuating rod for said brake pivotally connected to said knuckle lever, the pivotal point of the brake actuating rod and knuckle lever being moved to a position past the dead center of the fulcrum point of said knuckle lever when the brakes are in set position, and a stop for limiting the movement of said pivotal point in one direction.

3. In a brake operating mechanism, a brake, an actuating rod therefor, a knuckle lever, a fulcrum mounting therefor, said brake actuating rod being pivotally connected to said knuckle lever, the pivotal point of said brake actuating rod and knuckle lever being moved to a position past the dead center of the fulcrum point of said knuckle lever when the brakes are in set position, and a stop for limiting the movement of said pivotal point in one direction.

4. In a brake operating mechanism, a brake, an actuating rod therefor, a knuckle lever, a fulcrum mounting therefor, said brake operating rod being pivotally connected to said knuckle lever, the pivotal point of said brake actuating rod and knuckle lever being moved to a position past the dead center of the fulcrum point of said knuckle lever when the brakes are in set position, a stop for limiting the movement of said pivotal point in one direction, and means for positively actuating said knuckle lever to and from inoperative position.

5. A brake operating mechanism comprising a stationary U-shaped plate, a hand lever fulcrumed on one leg thereof, a knuckle lever fulcrumed on the other leg thereof, a link pivotally connecting said hand lever with said knuckle lever, a brake and a brake actuating rod pivotally connected to said knuckle lever.

6. A brake operating mechanism comprising a substantially U-shaped plate, a hand lever fulcrumed intermediate of its ends on one leg of said U-shaped plate, a knuckle lever fulcrumed on the other leg of said plate, a link connecting one end of said hand lever and said knuckle lever, a brake, and an actuating rod therefor, said rod being pivotally connected to said knuckle lever whereby the pivotal point of the brake actuating rod and knuckle lever will be moved to a position past the dead center of the fulcrum point of said knuckle lever when the brakes are in set position.

7. A brake operating mechanism comprising a substantially U-shaped plate, a hand lever fulcrumed intermediate of its ends on one leg of said U-shaped plate, a knuckle lever fulcrumed on the other leg of said plate, a link connecting one end of said hand lever and said knuckle lever, a brake, and an actuating rod therefor, said rod being pivotally connected to said knuckle lever whereby the pivotal point of the brake actuating rod and knuckle lever will be moved to a position past the dead center of the fulcrum point of said knuckle lever when the brakes are in set position, and a stop on said last mentioned leg for limiting the movement of said pivotal point in one direction.

8. A device of the character described comprising a substantially U-shaped plate, a hand lever fulcrumed intermediate of its ends on one leg of said plate and having one extremity extending into the bight thereof, a knuckle lever fulcrumed on the other leg of said plate, a link having one end pivotally connected to the lower extremity of said hand lever, and the other end pivotally connected to said knuckle lever, a brake, an actuating rod therefor pivotally connected to said knuckle whereby the pivotal point of the brake actuating rod and knuckle lever will be moved to a position past the dead center of the fulcrum point of said knuckle lever when the brakes are in set position, and a stop for limiting the movement of said pivotal point in one direction.

WATSON PURCELL.